Figure 7:
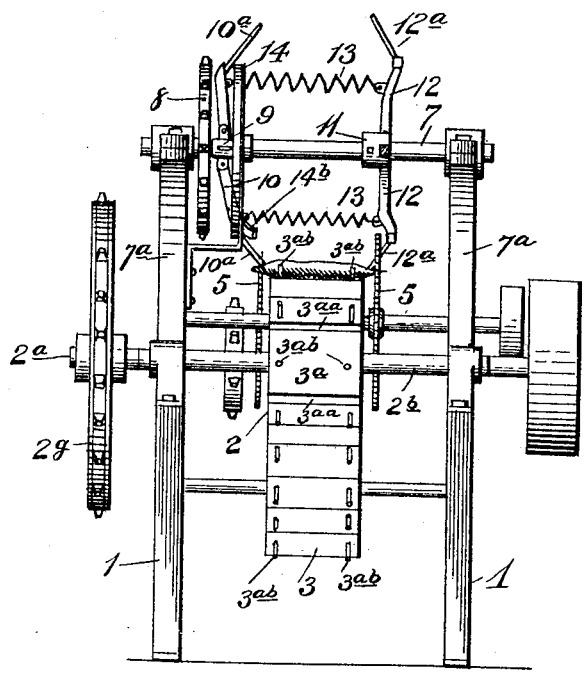

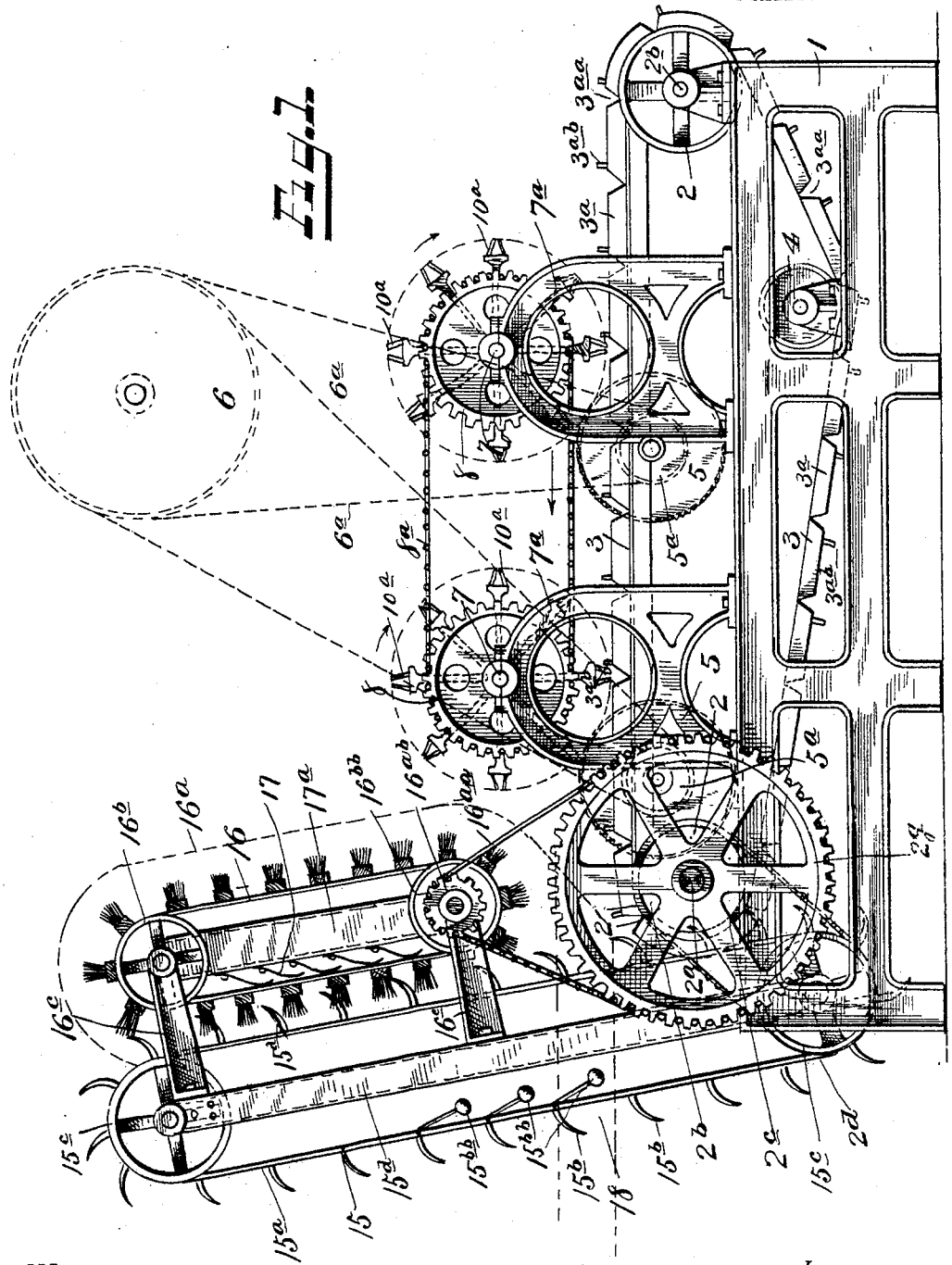

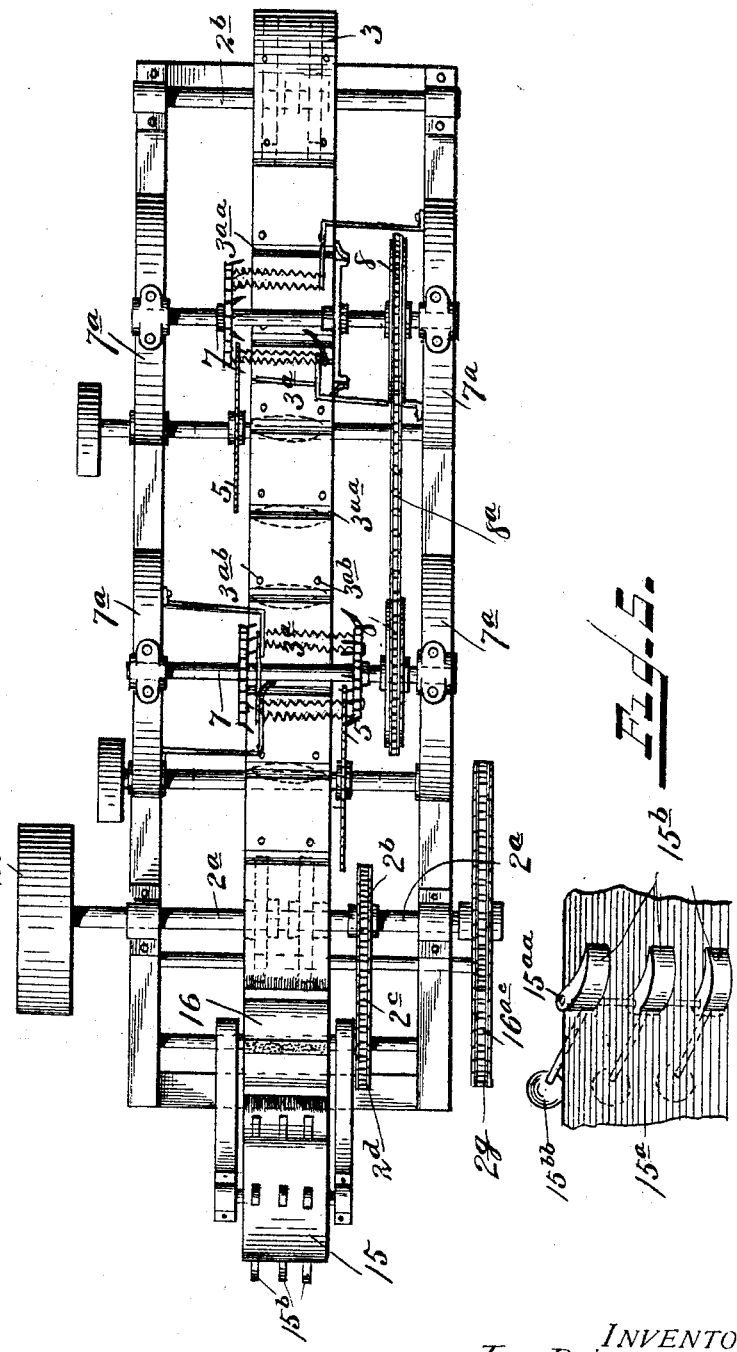

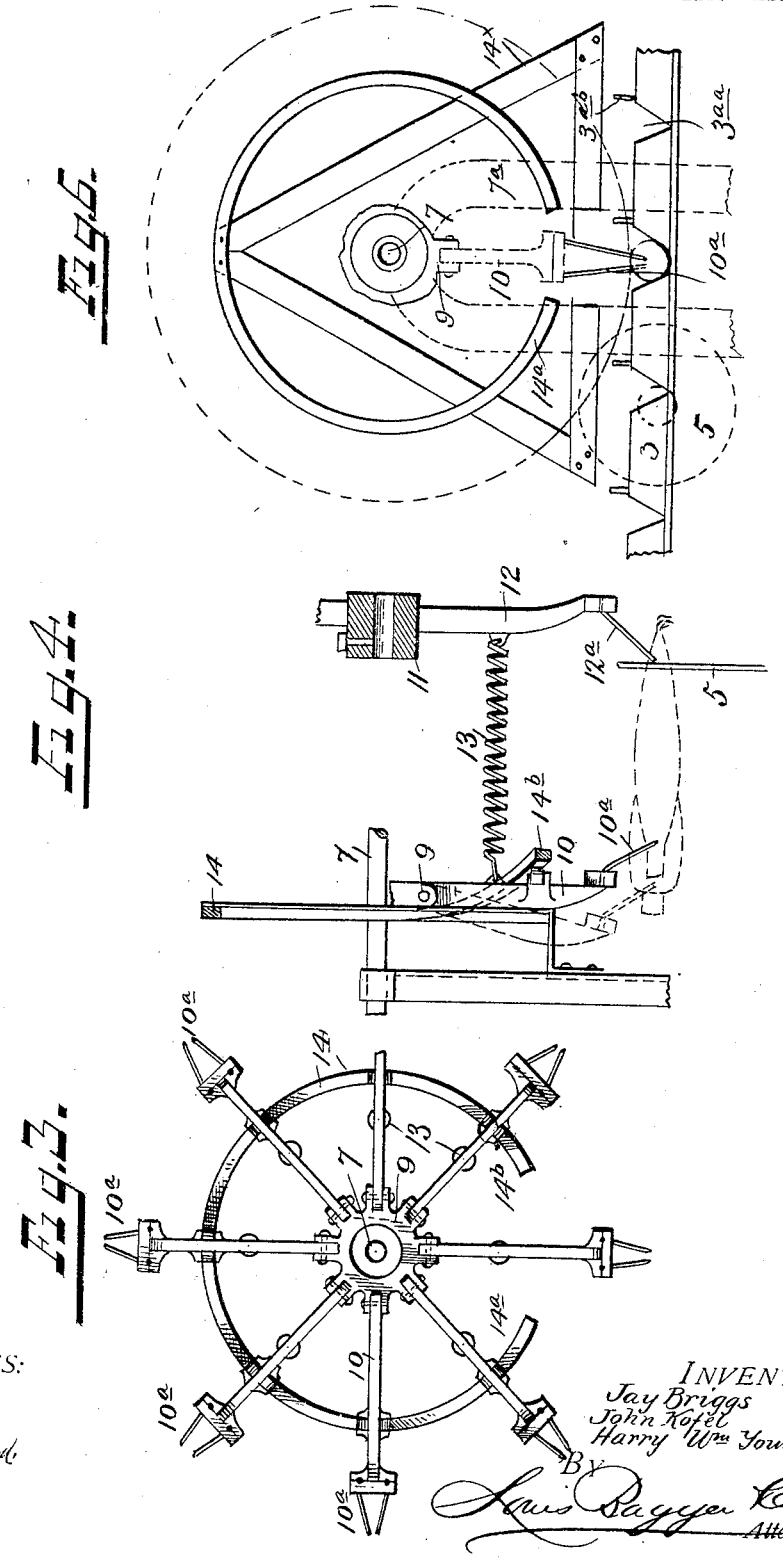

No. 800,543. PATENTED SEPT. 26, 1905.
J. BRIGGS, J. KOFEL & H. W. YOUNG.
CORN HUSKING MACHINE.
APPLICATION FILED JAN. 30, 1905.

4 SHEETS—SHEET 4.

UNITED STATES PATENT OFFICE.

JAY BRIGGS, JOHN KOFEL, AND HARRY WM. YOUNG, OF HOOPESTON, ILLINOIS.

CORN-HUSKING MACHINE.

No. 800,543.          Specification of Letters Patent.          Patented Sept. 26, 1905.

Application filed January 30, 1905. Serial No. 243,321.

*To all whom it may concern:*

Be it known that we, JAY BRIGGS, JOHN KOFEL, and HARRY WILLIAM YOUNG, citizens of the United States, residing at Hoopeston, in the county of Vermilion and State of Illinois, have invented new and useful Improvements in Corn-Husking Machines, of which the following is a specification.

Our invention pertains to improvements in corn-husking machines.

Said invention has for its object to readily and effectively feed or deliver the ears of corn to the saws or means for severing the end portions therefrom with the minimum waste; to provide for automatically presenting successively the opposite ends of the corn-ears to said severing means or saws; to perform the husking operation with facility and effectiveness and the husking of a great number of corn-ears in the relatively minimum time, and to carry out these ends in a simple and effective manner.

Said invention consists of certain features of novelty, which will first be described, and particularly pointed out by the claims.

In the accompanying drawings, illustrating the preferred embodiment of our invention, Figure 1 is a side elevation of said invention. Fig. 2 is a plan view thereof. Fig. 3 is an enlarged detached side view of a collar or hub provided with arms or spokes equipped with prongs or tines for engaging the corn-ears and delivering the latter to opposite like prongs or tines of relatively fixed arms. Fig. 4 is an enlarged detail view showing fractionally said arms and the action of the tines or prongs thereof upon a corn-ear. Fig. 5 is a like view of the corn-ear conveyer at the husking end of the machine. Fig. 6 is a sectional elevation at right angles to the plane of Fig. 4, viewing the parts from the inner side. Fig. 7 is a front end elevation, disclosing more fully the corn-ear-feeding contrivances.

In the disclosure of our invention we suitably mount upon a frame or support 1, preferably sprocket-wheels or pulleys 2, whose shafts $2^a 2^b$ are journaled at the ends thereof, and encompassing and driven by said pulleys or wheels is an endless conveyer or carrier 3, also engaging idlers or pulleys 4, suitably supported upon said frame, to hold said conveyer or carrier in proper operative position upon said wheels or pulleys. Said conveyer or carrier is preferably comprised of a webbing, with upraised portions or blocks $3^a$ secured thereon and having their opposed or contiguous edges sloped or beveled away from each other, as at $3^{aa}$, to provide for receiving corn-ears, said blocks or upraised portions also having projections or studs $3^{ab}$ so arranged thereon as to aid the retention of said corn-ears in the cavities or depressions formed by so beveling or sloping said blocks as shown. Said conveyer or carrier has arranged under its upper portion suitable supporting framework or means, as well understood, for its retention in horizontal position, said conveyer or carrier being suitably driven or actuated, as hereinafter disclosed.

Upon the shaft $2^a$ is fixed a sprocket wheel or pulley $2^b$, belted, as at $2^c$, to a corresponding wheel or pulley $2^d$, whose shaft $2^e$ is suitably journaled upon the frame 1, and through which pulleys and belting motion is directly transmitted to the husking mechanism, presently described. Also upon the shaft $2^a$ is secured a band-pulley $2^f$, to which is applied a belt (not shown) leading from a suitable motor (not shown) for transmitting motion to said pulley for actuating the carrier or conveyer 3. Again, to said shaft $2^a$ is secured a relatively large toothed or sprocket wheel $2^g$, the function of which will later appear.

Suitably hung in the frame 1 laterally of said conveyer or carrier are circular saws 5, arranged, however, at opposite sides thereof, one considerably away from or relatively in advance of the other, and whose shafts are properly driven from a pulley 6, mounted upon an overhead shaft connected up with a suitable driving source and belts $6^a 6^a$ encompassing said pulley and small pulleys $5^a$ secured to the shafts of said saws.

Suitably journaled or mounted in opposite pairs of standards $7^a$, secured upon the frame 1, are two driven shafts 7, having secured thereon toothed or sprocket wheels 8 encompassed, preferably, by a chain belt $8^a$ for the simultaneous coaction of said shafts and their rotation from left to right. Upon each of these shafts is suitably secured laterally of its center a collar or hub 9, provided with numerous pivoted arms 10, equipped in any suitable way with inward and downward deflected or inclined prongs or tines $10^a$, themselves converging somewhat toward their free or effective ends for engaging the opposed end of a corn-ear for throwing it a limited distance endwise, as in disposing it in the plane of rotation of a saw 5 upon the opposite side of the machine to provide for carrying it to the saw and the severing of an end portion therefrom, as illustrated by dotted lines. Also suitably secured upon each of said shafts laterally of the opposite side of its center is a second collar or hub 11, carrying a corresponding number of fixed arms 12, also equipped with like-arranged tines or prongs $12^a$, each two opposed pivoted and fixed arms being connected by or having attached thereto a helical spring 13, exerting a pulling action upon the pivoted arm for effecting the corn-ear-throwing action of the latter, the corn-ear in addition to being acted upon as thus intimated also being caught upon the tines or prongs $12^a$ as it is thus thrown for the holding thereof while the end portion is being severed therefrom, as will be readily appreciated by reference to Fig. 4. It will be understood that the pivoted and fixed arms are arranged upon opposite sides of the machine, respectively, to provide, as is apparent, for the corresponding shifting or throwing of the corn-ears for the severing or cutting off both ends of the latter.

Cam-tracks 14 are suitably secured in position upon upright supports or brackets $14^x$, secured to the frame 1, and are arranged adjacently to the pivoted arm carrying collars or hubs at opposite sides of said frame, respectively. Said cam-tracks have each one terminal $14^a$ arranged in about the same general plane with itself and its other terminal $14^b$ deflected laterally to a certain extent, as clearly seen in Fig. 4. It will be noted that just when a pivoted arm 10, arranged to have contact with a cam-track, leaves the terminal $14^a$ thereof, the spring 13 therefor being under tension, said arm, with its tines, which latter are in position to engage one end of a corn-ear, will be thrown inward by its said spring, causing its tines to carry the corn-ear laterally or toward and be caught upon the tines or prongs of the opposed relatively fixed arm 12, and thus by the movement of the latter be carried to the saw 5 upon that side of the machine for the severing of that end portion of said corn-ear. The laterally-deflected end terminal $14^b$ of the cam-track 14 is effective for picking up or disposing the respective pivoted arms into contact with and for permitting the traveling of said arms upon said cam-track, the springs 13 at this time, it will be noted, having thus been put under tension. Of course this operation is repeated for the other side of the machine, as has been above made apparent, to provide for the cutting off the corresponding end portion of the corn-ear, thus loosening the husks thereof for their ready subsequent removal, as presently disclosed.

A conveyer or elevator 15 is suitably arranged in an upward and outward inclination at the delivery end of the machine for receiving and elevating the corn-ears from the endless carrier or conveyer 3 after the cutting off of the end portions of said corn-ears. Said elevator or conveyer 15 is preferably comprised of an endless belt $15^a$, equipped with series or rows of peculiarly constructed and arranged teeth $15^b$ and encompassing sprocket or band pulleys $15^c$, whose shafts are suitably journaled in the upper and lower ends of the side or lateral pieces $15^d$ of an upright framing suitably secured and braced in position upon the frame 1. Each series or row of said teeth is pivoted or fulcrumed upon a common pivot-rod $15^{aa}$, having its bearing transversely of the belt $15^a$, said rows of teeth extending crosswise of the latter at suitable intervals apart throughout the same and are effective to engage and carry upward the corn-ears falling from the carrier 3. Each tooth has a normally upward facing or presented concave surface and a preferably opposite convex thickened surface with a rod extension $15^{aa}$ terminating, preferably, in a ball or weight $15^{bb}$, all as fully disclosed by Fig. 5, whereby said rows of teeth have a limited amount of controlled movement as they are borne upward by the action of their carrying-belt to provide for turning or shifting the position of the corn-ears to aid in removing the husks thereof. Also it will be noted that the weighted-rod portions of said teeth will have a tendency to deflect the latter upward when in a downward-facing position, as in their descent to permit the ready falling or escape therefrom of any fibrous or husk portions which would otherwise likely adhere thereto.

Outstanding from the elevator 15 and arranged close thereto and in parallel lines therewith is an endless belt of brushes 16, effective for removing the husk from the corn-ears as they are carried upward by said elevator and are engaged by said brush, as is apparent, especially from Fig. 1. Said endless belt of brushes 16, in addition to being inclosed or housed within a suitable casing $16^a$, as indicated by dotted lines in the last-noted figure, for properly guarding the same encompasses two end pulleys $16^b$ $16^{bb}$, whose shafts are journaled in the outer ends of standards or bearings $16^c$, with their bases bolted or secured to the inner edge portions of the lateral bars or pieces $15^d$ of the elevator-frame. The shaft $16^b$ aforesaid has secured thereto a sprocket-pulley $16^{ab}$, engaged by a suitable belt $16^{aa}$, also engaging the large toothed or sprocket wheel $2^g$, previously described, for driving the endless belt of brushes 16, as in effecting the husking operation. Said belt of brushes is suitably held to its work by the action of spring 17, secured to one edge of a longitudinal bar or piece $17^a$ and bearing or pressing upon said belt, as seen particularly in Fig. 1, said bar or piece 17ᵃ being suitably secured in place between the standards 16ᶜ, as observed from said figure.

A trunk or chute 18 is suitably connected to the lower end of the housing or casing 16, inclosing the husking-brushes, and is designed to extend to and receive the suction action of an exhaust-fan (not shown) for removing the husks falling or delivered into the bottom of said casing or housing.

Latitude is allowed as to details herein, since they may be changed according to circumstances without departing from the spirit of our invention.

We claim—

1. A machine of the character described, comprising a pivoted arm, a cam-track effective to retain said arm in initial position and to permit its subsequent release, means for severing an end portion from a corn-ear, means for feeding the corn-ear to said arm, and means for moving said arm laterally for delivering thereby the corn-ear to said severing means.

2. A machine of the character described, employing a pivoted arm laterally impelled, and equipped with means for engaging a corn-ear, a cam-track effective to retain said arm in initial position therefor and to permit the release of said arm for moving the corn-ear in line with means for severing an end portion therefrom, an opposed relatively fixed arm equipped to also engage said corn-ear and means for the delivery of the latter to said laterally-impelled and relatively fixed arms.

3. A machine of the character described, employing a carrier or conveyer for corn-ears, a pivoted arm laterally impelled and effective for engagement with a corn-ear at one end, and a cam-track adapted for engagement with said arm and for its retention in initial position and to permit the release of said arm for moving said corn-ear endwise upon said carrier, for the disposition thereof in line with said severing means.

4. A machine of the character described, employing a carrier or conveyer for corn-ears, a pivoted arm laterally impelled and effective for engagement with a corn-ear, at one end, a cam-track adapted for engagement with said arm and for its retention in initial position and to permit the release of said arm for moving the corn-ear upon said carrier in line with means for severing an end portion therefrom, and an opposed relatively fixed arm also equipped for engagement with said corn-ear, at its other end, to present and hold said corn-ear in line with said severing means.

5. A machine of the character described, employing a pivoted arm laterally impelled and effective for engagement with a corn-ear, a cam-track having one terminal arranged in practically the same plane with itself, and effective to retain said arm in initial position and for the release of the latter for engagement with, and the endwise movement, of said corn-ear for alinement with means for severing an end portion from said corn-ear, and a relatively fixed arm opposed to said pivoted arm and equipped for engagement also with said corn-ear and for the holding of the latter for the action of said severing means.

6. A machine of the character described, employing a pivoted arm laterally impelled and equipped for engagement with a corn-ear, a cam-track having one end terminal arranged practically in the same plane with itself and its other end terminal laterally deflected, and a relatively fixed arm equipped for engagement also with said corn-ear and opposed to the aforesaid arm and for holding said corn-ear for the action of means for severing an end portion of the latter and means for carrying said corn-ear to said arms.

7. A machine of the character described, employing a carrier comprising an endless belt having upraised portions or blocks with beveled opposed edges forming depressions or cavities to receive corn-ears, said blocks being equipped with upstanding studs to retain said corn-ears in said cavities, a pivoted arm laterally impelled and equipped for engagement with said corn-ears, a cam-track having its end terminals arranged in its own plane and laterally deflected, respectively and effective for the retention of said arm in initial position and for its release to move said corn-ears endwise, and an opposed relatively fixed arm equipped for engagement also with said corn-ears, and for the retention of the latter for the action of a severing means.

8. A machine of the character described, employing a shaft-carried collar provided with pivoted arms, means for the actuation of said arms, a cam-track having its end terminals arranged one in its own plane and the other laterally deflected, respectively, and means for the reception of the corn-ear from said pivoted arm and for its retention while having one end portion severed therefrom and means for carrying said corn-ears to said arm.

9. A machine of the character described, employing a shaft-carried collar provided with pivoted arms laterally impelled, a cam-track having its end terminals arranged in its own plane and laterally deflected, respectively, relatively fixed arms opposed to said pivoted arms, both said pivoted and fixed arms being equipped with tines or prongs for engaging the corn-ears and means for delivering said corn-ears to said arms.

10. A machine of the character described, employing an elevator whose belt is equipped with pivoted teeth having a common fulcrum and weighted-rod extension said teeth and rod extensions projecting from opposite sides of said belt respectively.

11. A machine of the character described, employing an elevator whose belt is equipped with pivoted teeth having a common fulcrum and concavo-convex effective end portions or points and weighted-rod extensions.

12. A machine of the character described, employing an endless belt of brushes for removing the husks from the corn-ears, an elevator having teeth for elevating said corn-ears to the action of said brushes, means for feeding said corn-ears to said elevator, means for severing both end portions of said corn-ears and means for first delivering one of the latter to a severing means and delivering the other ends thereof to like means while being fed as stated.

In testimony whereof we affix our signatures in presence of two subscribing witnesses.

JAY BRIGGS.
JOHN KOFEL.
HARRY WM. YOUNG.

Witnesses:
C. M. BRIGGS,
F. P. JOHNSON.